Oct. 16, 1962      G. GAMBERINI      3,058,475

CIGARETTE MAKING MACHINE

Filed Sept. 26, 1960      5 Sheets-Sheet 1

INVENTOR
GOFFREDO GAMBERINI

BY
ATTORNEY

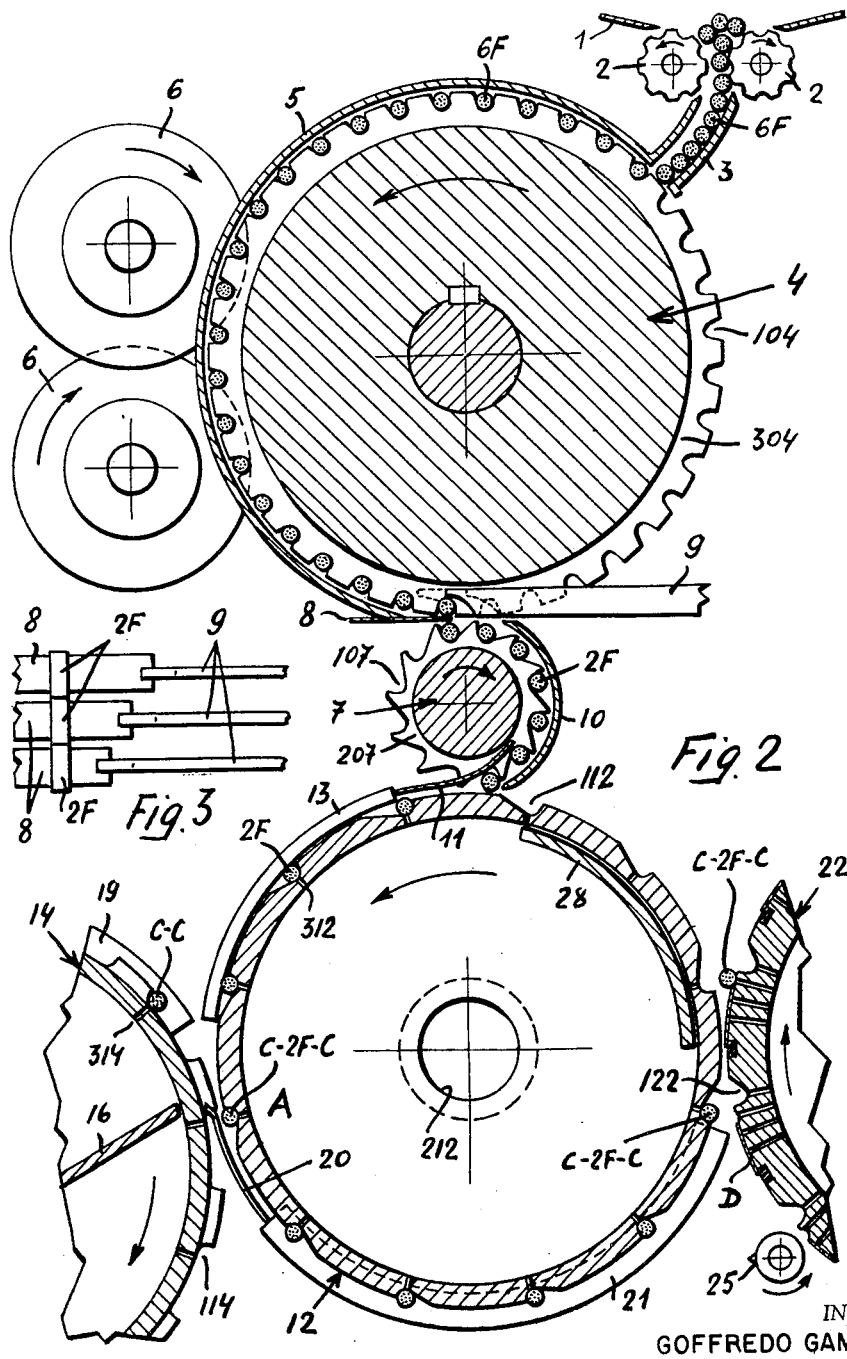

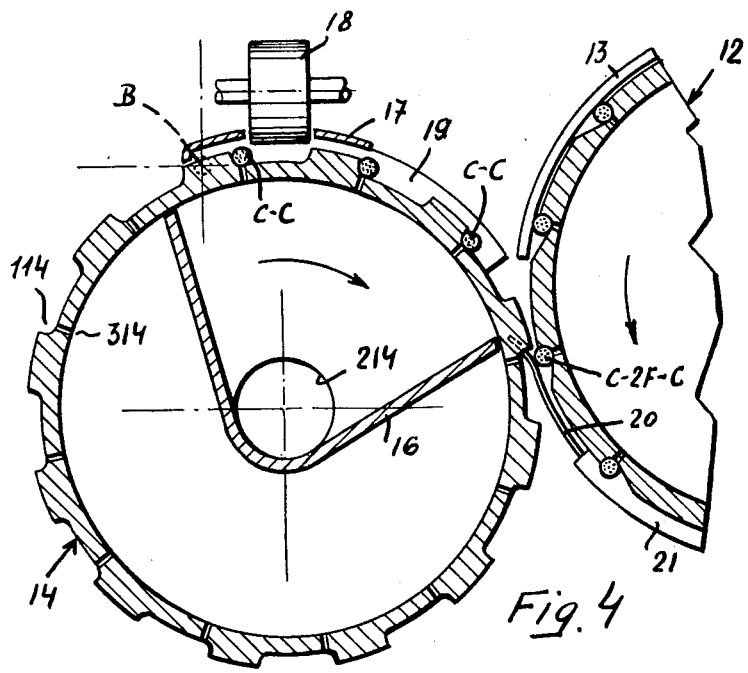
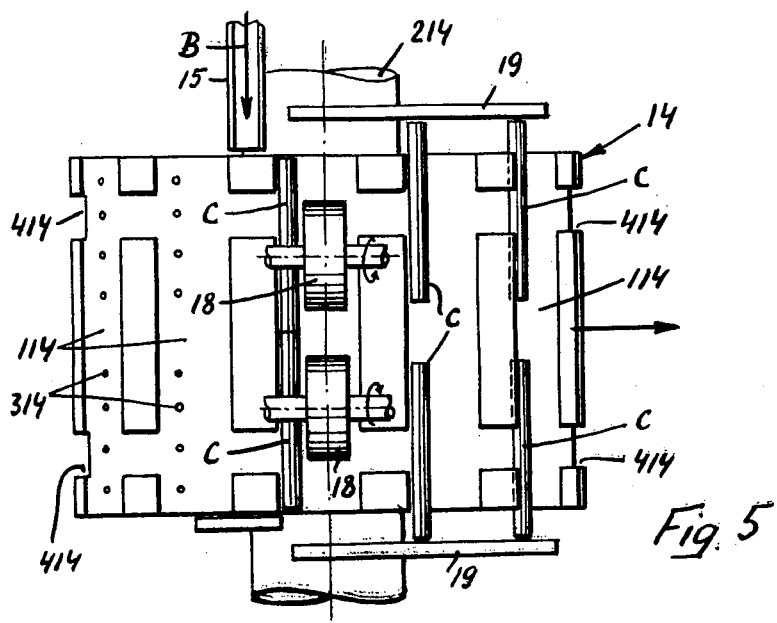

Oct. 16, 1962
G. GAMBERINI
3,058,475
CIGARETTE MAKING MACHINE
Filed Sept. 26, 1960
5 Sheets-Sheet 4
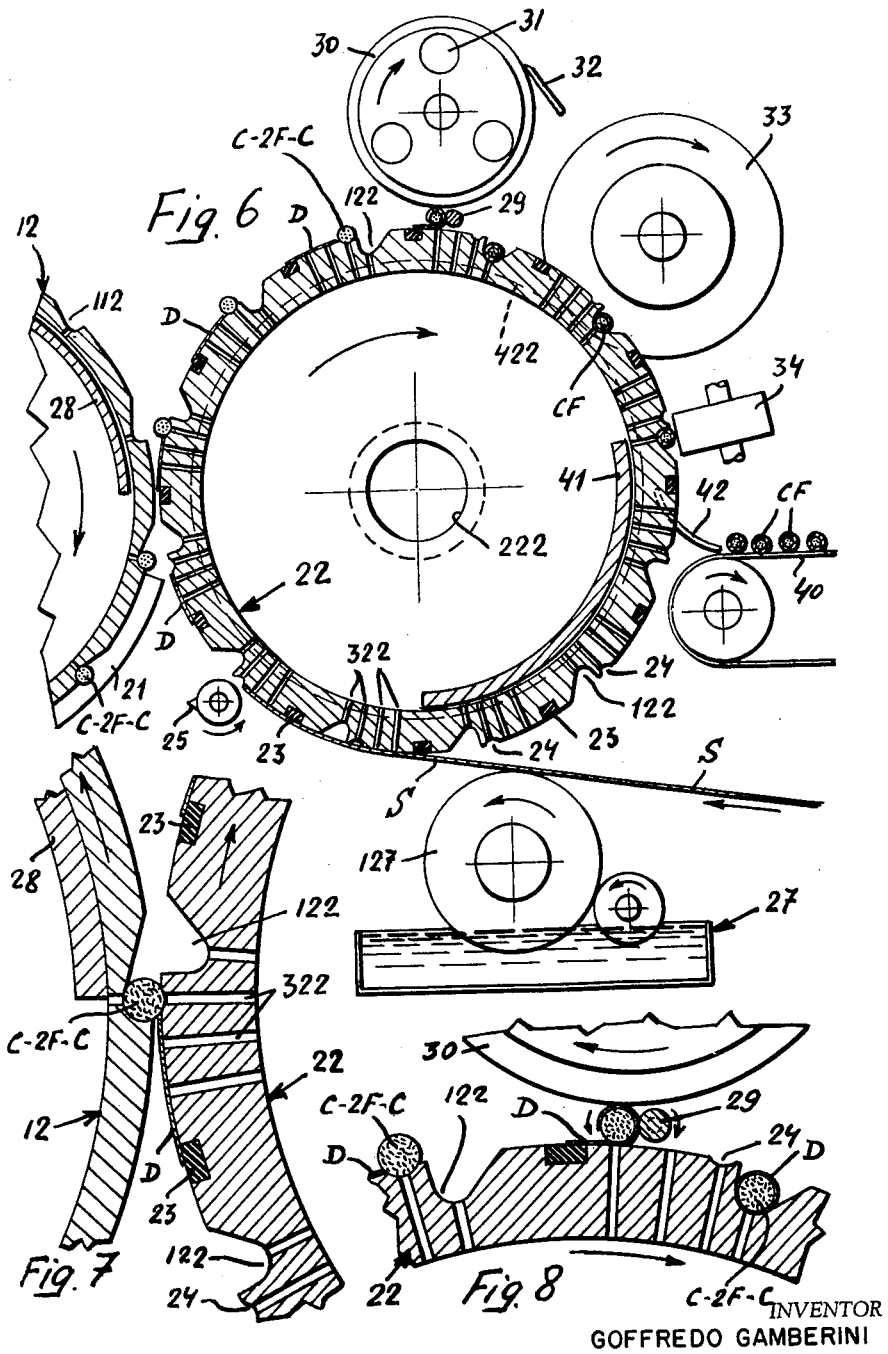
INVENTOR
GOFFREDO GAMBERINI
BY *Tenner D Enstad*
ATTORNEY Oct. 16, 1962 G. GAMBERINI 3,058,475
CIGARETTE MAKING MACHINE
Filed Sept. 26, 1960 5 Sheets-Sheet 5

INVENTOR
GOFFREDO GAMBERINI
BY
ATTORNEY

United States Patent Office 3,058,475
Patented Oct. 16, 1962

3,058,475
CIGARETTE MAKING MACHINE
Goffredo Gamberini, Bologna, Italy, assignor to American Machine & Foundry Company, a corporation of New Jersey
Filed Sept. 26, 1960, Ser. No. 58,490
Claims priority, application Italy Dec. 28, 1959
10 Claims. (Cl. 131—94)

The present invention relates to automatic rotary machines for the application of filters to cigarettes, and more particularly to machines of this kind which are used in combination with a cigarette-making machine.

In particular, the invention concerns machines of the above stated type in which the filter is added to a finished cigarette, it being fastened thereto by means of a band of suitable covering material (e.g., cork type paper or the like) which is wrapped and glued around the filter and around the corresponding end of the cigarette, forming the tip. Preferably, a filter of double the length of the single filter on the finished cigarette is interposed between two cigarettes already made and is fastened to both with a single band. The two cigarettes thus joined then are separated by a cut made through the middle of the interposed double filter.

Such machines are generally fed with filters which have a multiple length of the single or double filter used in the course of the manufacture. Therefore, these machines include in the filter feeding group a device which cuts the multiple filters in two or more parts of the required length. This device consists of a celled drum which receives in each of its cells a multiple filter length (e.g., a sextuple length) which is cut by rotating blades into the parts needed for the subsequent manufacture (e.g., into three double lengths).

After the cutting of each multiple filter there arises, however, the problem of staggering the coaxial single filter lengths obtained therefrom, to let them enter, one after the other, the subsequent manufacturing cycle. For this purpose, in the prior art machines, the drum for cutting the multiple filters consists of three coaxial distributing wheels having recesses. These wheels are independent of each other and are operated in such a way as to align their recessed cells at the point in which they receive the multiple filter, while they shift them angularly out of phase after the filter is cut, so as to transfer the single filters obtained from the multiple one, one after the other to the next stage of the machine. Then the recesses of the three wheels are shifted in phase again to receive another multiple filter, and so forth. This known device is, however, somewhat expensive and complicated, especially because of the mechanisms required for the cyclic shifting in and out of phase of the three coaxial wheels.

It is the main object of the invention to eliminate the aforesaid disadvantage and to simplify the device for the angular staggering of the single filters obtained from the cutting of a multiple filter.

In accordance with the invention, the cutting drum for the multiple filters transfers the cut filters to a distributing wheel, driven at a peripheral speed about as many times greater than that of said drum as there are single parts into which each multiple filter is cut. Between said drum and said wheel transfer means are provided, disposed at each single part cut off the multiple filter and offset or angularly staggered in such a way as to deposit the single parts of each multiple filter one after the other each in another successive cell of the distributing wheel.

In the known rotary machines for the application of filters on cigarettes, the wrapping and gluing of the tip band are effected by means of a rotating cage drum, in which the seat of each pair of cigarettes with interposed double filter consists of three rollers, of which at least one is driven positively. This design is somewhat complicated and costly, especially because of the great number of rollers and the necessity of equipping each single roller with a suitable glue-repelling covering. Another drawback of these machines is the necessity of changing the entire cage carrying the rollers when it is desired to change the caliber of the cigarettes.

Another purpose of the invention is, therefore, to simplify the application of the tip bands, making it more economical and also more adaptable to cigarettes of different caliber. For this purpose, according to another characteristic of the invention, the tip band, provided with glue and already cut to the proper length, is held by suction on the peripheral surface of a rotating drum and the two cigarettes with the interposed double filter, brought end to end with the latter and likewise held by suction on the periphery of said drum, are wrapped into said band by rolling them on the drum by means of a barring roller and of a rolling cylinder which cooperates with said drum and which may be provided with electric heating means for drying the glue. Upon completion of their wrapping in the tip band, the two cigarettes, now fast with the interposed double filter, fall from the peripheral surface of the drum into a recess thereof thus to overcome the barring roller passing under it and being retained by suction in said cell.

Lastly, in the known cigarette-making machines provided on their outlet side with a rotary device of the aforesaid type for the application of the filters, said device moves forward and back with respect to the line of formation of the continuous tube (worm), taking up considerable space and projecting forward from the front of the cigarette-making machine. This invention has for its object to eliminate this drawback, by providing a rotary machine for the application of the filters which moves only on one side, usually the rear, of the line of formation of the worm in the cigarette-making machine, without projecting on the front thereof and taking up much less space. This is achieved in part with the combined utilization of the above characteristics as well as with the particular arrangement of the various drums and wheels composing the machine, and in part also with the use of a pneumatic drum collecting the cigarettes produced by the cigarette-making machine.

These and other characteristics of the invention and the advantages deriving therefrom will be evident from the following description of a preferred form of construction illustrated by way of non-limitative example in the annexed drawing, in which:

FIG. 2 illustrates in vertical section and on a larger scale the middle part of the machine as per FIG. 1, with the cutting drum for the multiple filters and the distributing wheel.

FIG. 3 illustrates in plan the offset means for transfer of the filters from the cutting drum to the distributing wheel.

FIGURES 4 and 5 illustrate in vertical section and in plan the left part of FIG. 1, comprising the pneumatic drum collecting the cigarettes coming from the cigarette-making machine.

FIGURE 6 illustrates in vertical section and on a larger scale the right part of FIG. 1, with the drum for the application of the tip band.

FIGURES 7 and 8 illustrate in approximately natural size and in vertical section some particulars of FIGURE 6.

FIGURE 10 being the continuation of FIGURE 9.

Figure 1:
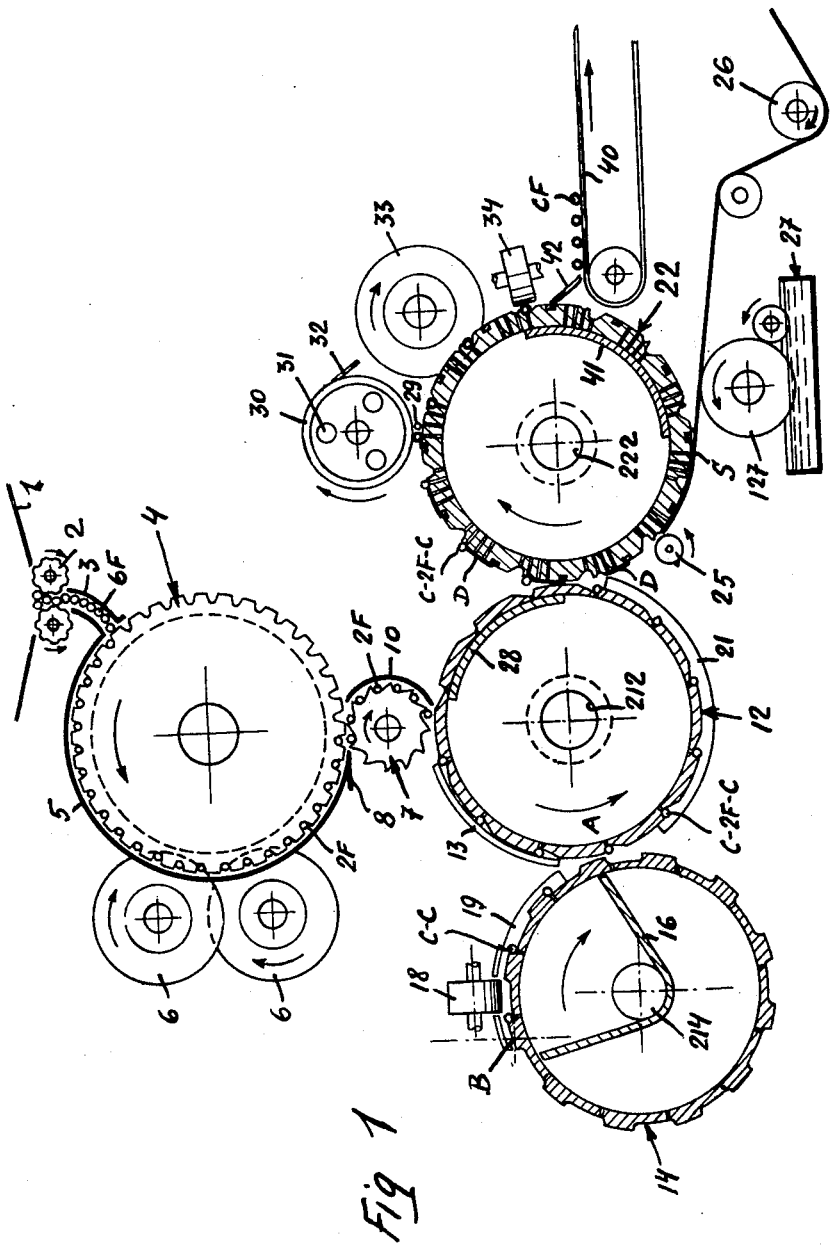
FIG. 1 illustrates diagrammatically in elevation, with parts in section, a rotary machine according to the invention for the application of filters to cigarettes.

With reference to FIGURES 1 and 2, the machine is fed with sextuple filter lengths 6F. These sextuple filter lengths 6F fall from a feed hopper 1, between two rotating toothed wheels 2 through channel 3, onto cutting drum 4, each entering a recess 104 along the periphery of that drum. Drum 4 is surrounded by a cylindrical guide surface 5. The filters 6F are cut each into three double filters 2F by two rotating circular blades 6 which pass through corresponding slots (not shown) in guide 5, and into corresponding annular slots 204 in drum 4, shown in more detail in FIGURE 9.

Figures 9, 10:
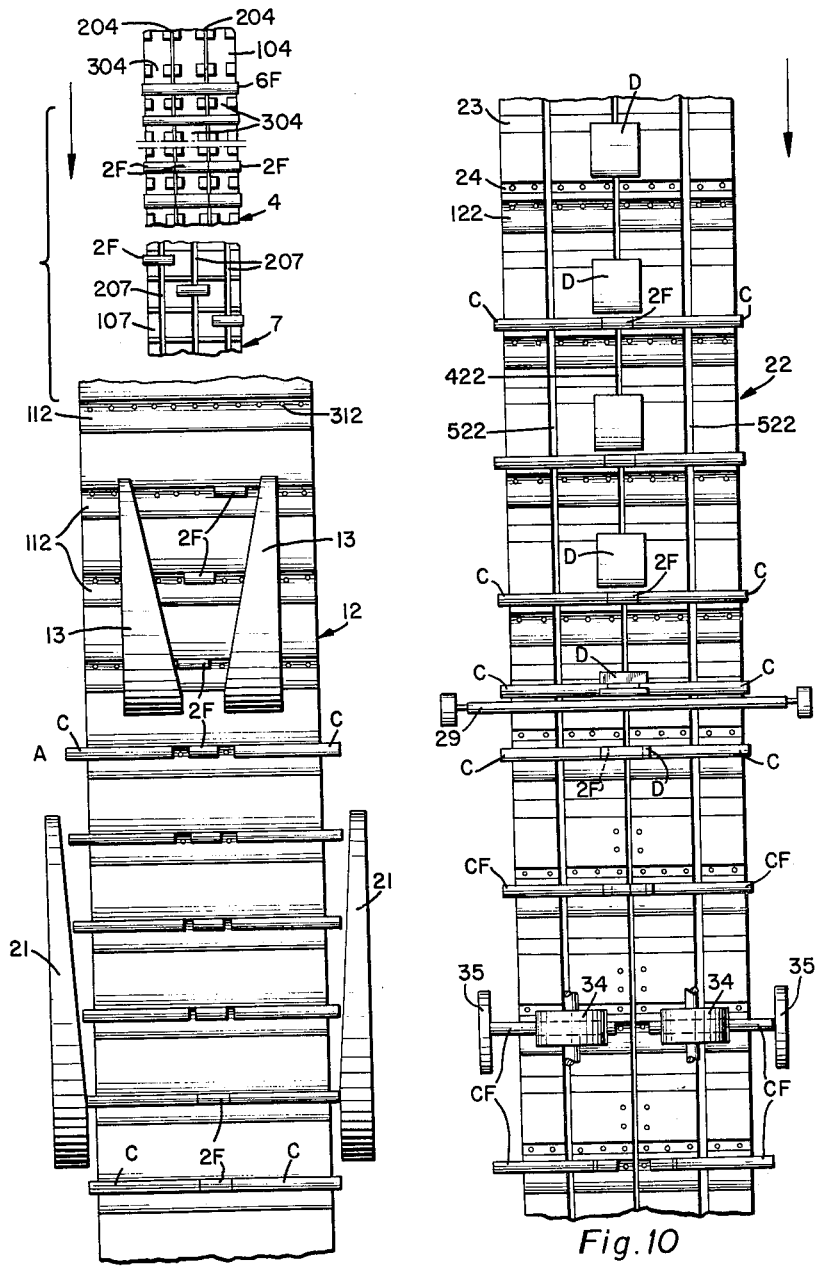
FIGURES 9 and 10 illustrate diagrammatically the successive production phases of the machine, with the various drums taking part therein represented partially in development and front view.

Under drum 4, is arranged a gear-like distributing wheel 7 driven at three times the peripheral speed of drum 4, so that each single recess 104 of drum 4 containing three double filter lengths coincides with three successive recesses 107 in wheel 7, to accommodate three lengths therein, as shown in FIGURE 9.

Between drum 4 and wheel 7 are disposed three coplanar plates 8, adjacent and substantially tangential to drum 4, and connecting with the peripheral guide 5 (FIGS. 2 and 3). These plates 8 are arranged each under a double filter 2F obtained by the cutting of the sixfold filter 6F and they end in different angular positions in reference to the axis of drum 4. That is, each plate 8 ends a little before one of the three angular positions in which each recess 104 of drum 4 coincides with three successive recesses 107 in wheel 7. The plates 8 thus form, for the three double filters 2F obtained from each sixfold filter 6F, supporting guides with transversely offset ends, that is, angularly staggered in the direction of rotation of drum 4, as illustrated in FIG. 3.

Preferably, drum 4 has above each plate 8 a circumferential groove 304, into which penetrates between drum 4 and wheel 7 from the side opposite the plates 8, an ejection tongue 9, whose leading edge is curved and terminates below in front of the corresponding plate 8 at such a distance from the end of the latter as to permit free passage therethrough of a double filter length 2F, while it extends above to a similar distance on plate 8, being inserted on the filters 2F lodged in recesses 104 of drum 4 (FIG. 2).

Under the above conditions, the three double filters 2F obtained from each sixfold filters 6F, and initially aligned in the same recess 104 of drum 4, fall with the aid of the ejection tongues 9 on the staggered thresholds formed by the ends of the supporting plates 8, one after the other, into three different successive cells 107 of the distributing wheel 7 below being thus staggered angularly on the latter (see also FIG. 9).

The distributing wheel 7, surrounded in part by a fixed guide 10, transfers the individual double filters 2F one after the other each to a successive recess 112 of a hollow assembly drum 12 below, preferably with the aid of ejection tongues and of a guide 11 which enter into corresponding circumferential grooves 207 of wheel 7. The filters 2F are held in the recesses 112 of drum 12, by suction generated in that drum through the tubular shaft 212 thereof and which manifests itself peripherally through small holes 312 in the bottom of recesses 112. Moreover, the depth of recesses 112 is such that the filters 2F lodged therein project in part from the outer shell of drum 12.

On assembly drum 12, and also on the distributing wheel 7, the individual filters 2F are arranged mutually staggered in axial direction, one in the center of the recess and the other two displaced alternately to the right and left in successive recesses, analogously to their position in the single recess 104 of the distributing drum 4 (see FIG. 9). To bring each filter 2F into the center of the respective recess 112, as is necessary for the subsequent manufacture, drum 12 passes closely under two peripheral deflecting sector guides 13 which are fixed and have opposite edges converging in the direction of rotation of drum 12. These guides 13 act on the outer heads of the filters 2F and deflect all filters to the center of the respective recesses 112 as shown in the lower part of FIG. 9.

Then, approximately at point A of assembly drum 12, two cigarettes C are deposited in each recess 112 of said drum, one on either side of the double filter length 2F, and they are again held in recess 112 by suction (FIGS. 2 and 9). The cigarettes C may be furnished directly from the continuous cigarette-making machine with which the present machine is combined. More precisely, the two drums 4 and 12 with the interposed distributing wheel 7 can be positioned behind the rod-forming line B in the cigarette-making machine and on the outlet side thereof. (FIGS. 1, 4 and 5.) The shafts of drums 4 and 12 are parallel to the rod-forming line B, and the cigarettes C produced by the cigarette-making machine and already cut to the desired length are collected and transferred from the rod-forming line B to assembly drum 12 by means of a suitable pneumatic collecting drum 14.

As shown in FIGURES 4 and 5, delivery drum 14 is disposed below rod-forming line B, which is indicated diagrammatically in FIGURE 5, with the arrow of arrival of the cigarettes and with the guide 15 of the latter. Drum 14 is tangential to said line of formation B and its axis of rotation is parallel thereto. Peripherally drum 14 is provided with elongated axial grooves 114 while internally it is hollow and in it a vacuum is maintained through its tubular shaft 214. The suction manifests itself externally through the small holes 314 provided in the bottom of each groove 114. This suction effect is delimited by means of an internal fixed angle diaphragm 16 which extends, in the direction of rotation of drum 14, from a little before the rod-forming line B to almost the contact point A between drum 14 and drum 12. Thereabove, drum 14 is in part covered by a fixed shield 17.

In each groove 114 of drum 14 are lodged, at the passage thereof through the rod-forming line B, two cigarettes C, which are aligned and end to end and which are held by suction on drum 14. Then these two cigarettes C, shown in transverse section by C—C, pass under two sponge rubber rolls 18 or the like, having axes extending crosswise to that of drum 14 and rotating in opposite directions. These two rolls 18 come briefly into light contact each with one of the two cigarettes C in each groove 114 of drum 14 and cause these cigarettes to move axially in opposite directions outward, to lateral stop plates 19 fast on the side of drum 14. In this way the two coaxial cigarettes C are spaced axially from each other by a distance greater than the length of the double filter 2F (FIG. 5). At the end of the suction sector of drum 14, the two cigarettes C are transferred into recess 112 of assembly drum 12, by means of two fixed ejection and guide tongues 20 which engage in corresponding circumferential grooves 414 of drum 14.

Below point A, there is then in each recess 112 of the assembly drum 12, a composite assembly C—2F—C consisting of two coaxial aligned cut lengths of cigarette rod C and an interposed double filter mouthpiece 2F. Both cigarettes C project by their outer ends from the heads of drum 12 and are at first detached from the interposed filter 2F (FIG. 9). Below the point A, drum 12 rotates between two fixed lateral plates 21, which converge in the direction of rotation of drum 12 (FIGS. 2 and 9). The two cigarettes C slide by their outer ends over these converging lateral plates 21 and are pushed by them into the respective cell 112, so as to apply against the interposed double filter 2F.

On the side of assembly drum 12, opposite delivery drum 14 is disposed another rotating hollow winding drum 22, which presents peripheral, fairly deep axial recesses or grooves 122, alternating with shallow and barely indicated axial grooves 24 (FIGS. 1, 6, 7, 8 and 10). Between each recess 122 and the groove 24 which precedes it in the direction of drum 22, there is inserted in the latter and fixed an axial spline or stud 23 of hard metal. The distance between each recess 122 and the next groove 24 may be very small, as illustrated. In the bottom of each recess 122 and of each groove 24, as well as between the latter and the next insert 23 are small holes 322, while in drum 22 a vacuum is maintained for example, through the tubular shaft 222 thereof.

On the lower part of drum 22 (FIGS. 1 and 6) there is applied and held peripherally by suction the end of a strip S of the covering material (e.g. cork type paper or the like) intended to wrap the filter and to fasten it to the cigarette, forming the tip. This strip S passes over a feed roll 26 and over the glue-spreading roll 127 of a gluing device 27. On drum 22 the individual bands D are cut from the strip S by a rotating cutting knife 25 which cooperates with the successive hard-metal inserts 23 of drum 22. The peripheral speed of the feed drum 26 is smaller than that of drum 22, so that, after the cutting of a band D by the rotating knife 25 at an insert 23, the end of strip S lags in relation to drum 22, while still adhering thereto by suction, and it is thus separated from the previously cut band D by a distance behind the following groove 24 of drum 22. In this way, after the rotating knife 25, there are centrally applied, at regular angular intervals on the peripheral surface of drum 22 individual bands D, held by suction on drum 22 and externally provided with glue and each extending from the rear edge of each groove 24, backward to about half the next hard-metal insert 23 (FIG. 6 and 10).

The groups C—2F—C, each consisting of two coaxial cigarettes C with a double filter 2F between them, are transferred by assembly drum 12, into the successive grooves 24 of drum 22, at the point of contact between these two drums, where the recesses 112 of drum 12, coincide one after the other with the grooves 24 of drum 22, while at the same time the suction is interrupted through the holes 312 of drum 12 by a fixed internal diaphragm 28 (FIGS. 2, 6 and 7). The two cigarettes C with the filter 2F between them are secured and held by suction in groove 24 of drum 22, and are carried upward by the latter together with the band D.

Above, drum 22 passes under (close to but without touching it) a barring roller 29, which may idle or be driven in the direction of the arrow as per FIG. 8. Above said barring roller 29 is disposed a rolling cylinder 30, driven in the direction of the arrow as per FIGURES 1, 6 and 8, that is, so as to move in the direction of drum 22, without coming into contact with either that drum or with the barring roller 29.

Under the above conditions, the two cigarettes C with the double filter 2F between them encounter the barring roller 29 and are stopped by it and forced to roll back over the peripheral surface of drum 22 and onto the next following band D, leaving the shallow groove 24 in contact with cylinder 30 which brings about also their aforesaid rolling movement (FIGS. 6, 8 and 10). In this way, the two cigarettes C with the interposed double filter 2F are wrapped with band D which winds on tightly and is glued firmly around the entire double filter 2F and around the ends of both cigarettes C attached thereto. The rolling cylinder 30, which is the last to come into contact with the band D already adhering to the cigarettes C and to the filter 2F, may be provided with electric heating devices 31 to dry the glue. A scraper 32 keeps the cylinder 30 clean, while the barring roller 29 is preferably provided with a glue-repellent coating.

Continuing in their rearward rolling on drum 22, the two cigarettes C, now joined by the band D to the interposed double filter 2F, fall into the next recess 122 of drum 22 and due to the depth of this recess, pass freely under the barring roller 29, being held by suction in said recess 122 and slightly projecting therefrom on the periphery of drum 22. Subsequently, this double cigarette is divided on the same drum 22 into two single cigarettes with filter CF, by a rotating circular blade 33 which inserts itself into a circumferential groove 422 of drum 22 and makes the cut through the middle of the double filter 2F. Drum 22 then passes close to two sponge rubber rolls 34 or the like, rotating in opposite directions about axes transverse to that of drum 22, and each coming into light contact with one of the two cigarettes CF in each cell 122, separating and axially spacing said cigarettes from each other, that is, causing them simultaneously to slide in opposite directions outward, to fixed lateral stop plates 35. Lastly, the two cigarettes with filter CF are dropped by drum 22, onto a conveyor belt 40, each by means of a guide and ejection tongue 42 which inserts itself into a corresponding circumferential groove 522 of drum 22, while the suction effect is interrupted through the holes 322 of drum 22 by means of a fixed internal diaphragm 41.

The invention is, of course, not limited to the form of construction just described and illustrated, but may be widely varied and modified, especially with regard to the various structural details, or be applied only in part, for example, using the device for the staggering of the single filters obtained by cutting a multiple filter also in combination with any other device for the application of the tip bands, or vice versa, all without departing from the informative principle set forth above and claimed hereafter.

What is claimed is:

1. A machine for attaching filter tips to cigarettes comprising a source of supply of multiple lengths of mouthpiece material and a source of supply of cut cigarette rod; a rotating cutting drum having recesses along the periphery thereof for receiving lengths of mouthpiece material from said source, rotating cutting means associated with said drum for subdividing said lengths, a distributing wheel having recesses along the periphery thereof for receiving said subdivided lengths and rotating at a peripheral speed as many times greater as that of said cutting drum as there were subdivisions made by cutting said multiple lengths of mouthpiece material so as to receive said subdivided lengths in an angularly staggered fashion in said recesses; a rotating cigarette delivery drum having suction means therefor and suction grooves along the periphery thereof for receiving cut cigarette rod lengths from said source thereof, means in said delivery drum for cutting off suction in said grooves when said grooves reach a predetermined point to permit removal of said cut rod lengths therefrom; means for axially separating said cut rod lengths while in said grooves; an assembly drum provided with suction means and having suction grooves along the periphery thereof for receiving angularly staggered multiple mouthpiece lengths from said distributing wheel; peripheral guide plates on said assembly drum for delivering said mouthpiece lengths into said grooves of said assembly drum and for inserting cut rod lengths picked up from said delivery drum on opposite sides of said mouthpiece lengths, means for cutting off suction to said grooves of said assembly drum at a predetermined point; a uniting band-applying drum adjacent said assembly drum and having along the periphery thereof alternately positioned recesses and shallow grooves provided with suction means for picking up from said assembly drum at said second mentioned predetermined point a cigarette assembly consisting of cut rod lengths in axial abutment with a multiple filter and positioning said cigarette assembly in one of said shallow grooves, means along said band applying drum intermediate successive recesses and grooves for holding prepasted cut lengths of uniting band material; a barrier roller positioned a distance from said band-applying drum for causing a composite cigarette assembly held in one of said shallow grooves to roll backward over said uniting band material and into the next recess in said band-applying drum.

2. A machine for attaching filter tips to cigarettes comprising a source of supply of multiple lengths of filter material and a source of supply of cut cigarette rod; a rotating cutting drum having recesses along the periphery thereof for receiving lengths of filter material from said source, rotating cutting means associated with said drum for subdividing said lengths, a distributing wheel having recesses along the periphery thereof for receiving said subdivided lengths; a rotating cigarette delivery drum having suction means therefor, suction grooves along the periphery thereof for receiving cut cigarette rod lengths from said source thereof, means in said delivery drum for cutting off suction in said grooves when said grooves reach a predetermined point to permit removal of said cut rod lengths therefrom, means for axially separating said cut rod lengths while in said grooves; an assembly drum provided with suction means and having suction grooves along the periphery thereof for receiving multiple filter lengths from said distributing wheel; peripheral guide plates with offset ends on said assembly drum adjacent said wheel for centering said filter lengths in said grooves in said assembly drum, and adjacent said cigarette delivery drum for inserting cut rod lengths picked up from said delivery drum on opposite sides of said filter lengths, means for cutting off suction to said grooves at a predetermined point; a uniting band-applying drum adjacent said assembly drum and having along the periphery thereof alternately positioned recesses and shallow grooves provided with adjustable suction means for rendering the same inoperative at a predetermined point for picking up from said assembly drum at said last mentioned predetermined point a cigarette assembly consisting of cut rod lengths in axial abutment with a multiple filter and positioning said assembly in one of said shallow grooves, means along said band applying drum intermediate said recesses and grooves for holding prepasted cut lengths of uniting band material, a glue repellent barrier and a rolling cylinder positioned a distance from said band-applying drum for stopping and causing said assembly to roll backward over said uniting band material from one of said grooves into the following recess for transfer past said barrier and said rolling cylinder; a rotating blade for severing the cigarette assemblies while they are held in said recesses, means for axially separating the resulting filter tip cigarettes and means for ejecting said cigarettes from said recesses when said band-applying drum reaches said point where suction is shut off from said recesses.

3. In combination with a uniting band applying device for attaching uniting band material to a filter tip cigarette assembly comprising a rotating drum having along the peripheral surface thereof alternating successive recesses and shallow grooves having suction means therein, means for holding a uniting band between the rear edge of one of said shallow grooves and the front of one of said recesses, means positioned a predetermined distance from said drum for stopping and causing an assembly held by suction in a shallow groove to roll over said uniting band material past one of said grooves and into the following recess.

4. A uniting band applying device comprising an endless first conveyor drum having uniting band rolling surfaces thereon, said conveyor drum having pockets formed adjacent each of said drum rolling surfaces for receiving assemblies having had uniting bands applied thereabout, a second drum spaced from the surfaces of said first conveyor drum for rolling an asembly over a uniting band between said drums to apply a uniting band thereabout, means for delivering uniting bands and composite cigarette assemblies to said uniting band rolling surfaces, and a drive for moving the rolling surfaces of said conveyor drum successively past said second drum to apply uniting bands about successive composite assemblies between said drums to cause each assembly after it has had the uniting band applied thereabout to drop into each successive pocket and means for receiving said assemblies from said pockets.

5. A uniting band applying device comprising an endless conveyor drum having uniting band rolling surfaces thereon, said conveyor drum having pockets formed adjacent each of said rolling surfaces for receiving assemblies having had uniting bands applied thereabout, a second drum having surfaces spaced from the surfaces of said first drum for rolling an assembly over a uniting band between said drums to apply a uniting band thereabout, means for delivering uniting bands and composite cigarette assemblies to said uniting band rolling surfaces, and a drive for moving the drum rolling surfaces of said conveyor drum successively past said second drum surfaces to apply uniting bands about successive composite assemblies between said conveyor drum surfaces and said second drum surfaces to cause each assembly after it has had the uniting band applied thereabout to drop into each successive pocket, said drum conveyor having a groove extending around the periphery of said drum conveyor, a rotating knife positioned to extend into said groove to sever cigarettes carried in said pockets as said conveyor drum travels past said knife, and means for collecting said severed cigarette lengths from said pockets.

6. Apparatus for making mouthpiece cigarettes comprising a drum, rolling surfaces formed on the periphery of said drum, means for delivering composite cigarette assemblies which are to be united and uniting bands to said drum, a contra rolling drum surface spaced from said drum to roll a uniting band about an assembly between said opposed rolling surfaces on said drum and said contra rolling surface, a barrier roller positioned in the path of said assemblies adjacent the area where said opposed rolling surfaces are located to cause the composite assembly and uniting band to be applied thereabout between said surfaces, said drum having means to move an assembly past said barrier roller after a uniting band has been applied about an assembly.

7. Apparatus for making mouthpiece cigarettes comprising a drum, rolling surfaces formed on the periphery of said drum, means for delivering composite cigarette assemblies which are to be united and uniting bands to said drum, a contra rolling drum surface spaced from said drum to roll a uniting band about an assembly between said opposed rolling surfaces on said drum and said contra rolling surface, a barrier roller positioned in the path of said assemblies adjacent the area where said opposed rolling surfaces are located to cause the composite assembly and uniting band to be applied thereabout between said surfaces, and said drum having means to move an assembly past said barrier roller after a uniting band has been applied about an assembly, said drum having a groove formed around the middle of the periphery thereof, a traveling cutting member passing through said groove at a predetermined portion of the path of travel of said drum to subdivide assemblies having uniting bands applied thereabout into individual mouthpiece cigarettes.

8. Apparatus for making mouthpiece cigarettes comprising a first drum having a series of spaced rolling surfaces positioned around the periphery thereof, said drum having pockets formed therein adjacent each of said rolling surfaces, a second drum having a rolling surface tangentially spaced from the rolling surfaces of the first drum a sufficient distance to cause uniting bands to be rolled about cigarette assemblies, means for delivering uniting bands to said rolling surfaces, means for delivering composite assemblies which are to be joined together to the uniting bands supported on said first drum rolling surfaces, a drive for moving said assemblies and uniting bands into the space between one of said first drum rolling surfaces and said second drum to apply a uniting band about the assemblies by rolling between said first and second drum surfaces, said first and second drum surfaces being spaced a sufficient distance from each other to cause said assemblies to fall into said pockets, after the uniting band has been applied to join the composite assemblies together whereby it can pass by said second drum.

9. Apparatus for making mouthpiece cigarettes comprising a first drum having a series of spaced rolling surfaces positioned around the periphery thereof, said drum having pockets formed therein adjacent each of said rolling surfaces, a second drum having a rolling surface tangentially spaced from the rolling surfaces of the first drum a sufficient distance to cause uniting bands to be rolled about cigarette assemblies, means for delivering uniting bands to said first drum rolling surfaces, means for delivering composite assemblies which are to be joined together to the uniting bands supported on said drum rolling surfaces, a drive for moving said assemblies and uniting bands into the space between one of said first drum rolling surfaces and said second drum to apply a uniting band about the assemblies by rolling between said first and second drum surfaces, said first and second drum surfaces being spaced a sufficient distance from each other to cause said assemblies to fall into said pockets after the uniting band has been applied to join the composite assemblies together whereby it can pass by said second drum, and a barrier roller positioned in the space between said first and second drum surfaces to prevent an assembly from moving out from between said first and second drum surfaces when the uniting band is being applied thereabout.

10. Apparatus for making mouthpiece cigarettes comprising a first drum having a series of spaced rolling surfaces positioned around the periphery thereof, said drum having pockets formed therein adjacent each of said rolling surfaces, a second drum having a rolling surface tangentially spaced from the rolling surfaces of the first drum a sufficient distance to cause uniting bands to be rolled about cigarette assemblies, means for delivering uniting bands to said drum rolling surfaces, means for delivering composite assemblies which are to be joined together to the uniting bands supported on said first drum rolling surfaces, a drive for moving said assemblies and uniting bands into the space between one of said first drum rolling surfaces and said second drum to apply a uniting band about the assemblies by rolling between said first and second drum surfaces, said first and second drum surfaces being spaced a sufficient distance from each other to cause said assemblies to fall into said pockets after the uniting band has been applied to join the composite assemblies together whereby it can pass by said second drum, a barrier roller positioned in the space between said first and second drum surfaces to prevent an assembly from moving out from between said first and second drum surfaces when the uniting band is being applied thereabout, said barrier roller being spaced above said pockets a sufficient distance to allow the assembly after it has dropped into the pocket adjoining the rolling surface to pass by said barrier roller, said drum having a ledger groove formed around the periphery of said rolling drum, a knife positioned to extend into said ledger groove to effect a sub-dividing cut through said assembly as it is supported in said pockets to make individual length mouthpiece cigarettes.

References Cited in the file of this patent

FOREIGN PATENTS

| | | |
|---|---|---|
| 745,752 | Great Britain | Feb. 29, 1956 |
| 785,417 | Great Britain | Oct. 30, 1957 |
| 557,280 | Italy | Feb. 13, 1957 |